United States Patent
Stolt et al.

(10) Patent No.: US 12,465,943 B2
(45) Date of Patent: Nov. 11, 2025

(54) DISPENSER AND A CONTROL METHOD OF THE DISPENSER

(71) Applicant: Hilti Aktiengesellschaft, Schaan (LI)

(72) Inventors: Rocco Stolt, Niederraunau (DE); Michael Wiedemann, Koenigsbrunn (DE)

(73) Assignee: Hilti Aktiengesellschaft, Schaan (LI)

( * ) Notice: Subject to any disclaimer, the term of this patent is extended or adjusted under 35 U.S.C. 154(b) by 241 days.

(21) Appl. No.: 18/256,344

(22) PCT Filed: Nov. 16, 2021

(86) PCT No.: PCT/EP2021/081801
§ 371 (c)(1),
(2) Date: Jun. 7, 2023

(87) PCT Pub. No.: WO2022/122313
PCT Pub. Date: Jun. 16, 2022

(65) Prior Publication Data
US 2024/0017287 A1    Jan. 18, 2024

(30) Foreign Application Priority Data
Dec. 10, 2020 (EP) .................................. 20213002

(51) Int. Cl.
*B05C 17/01* (2006.01)
*B05C 17/005* (2006.01)

(52) U.S. Cl.
CPC .... *B05C 17/0103* (2013.01); *B05C 17/00553* (2013.01)

(58) Field of Classification Search
CPC .......... B05C 17/0103; B05C 17/00553; B05C 11/10
See application file for complete search history.

(56) References Cited

U.S. PATENT DOCUMENTS 5,672,155 A * 9/1997 Riley .................... B01L 3/0227
604/152
6,216,822 B1   4/2001 May et al.
(Continued)

FOREIGN PATENT DOCUMENTS

| DE | 10 2016 213 882 |   | 2/2018 |
| DE | 102016213882 A1 | * | 2/2018 |
| EP | 2 314 384 |   | 4/2011 |

OTHER PUBLICATIONS

International Search Report issued Jan. 25, 2022, in PCT/EP2021/081801, 3 pages.
(Continued)

*Primary Examiner* — Bob Zadeh
(74) *Attorney, Agent, or Firm* — Grüneberg and Myers PLLC

(57) ABSTRACT

A dispenser for compound-containing containers includes a receiving chamber for a container; at least one push rod displaceable relative to the receiving chamber; a motor for moving the at least one push rod; a control unit for controlling the motor; a main switch; an operation selection switch for setting a selected amount of the compound to be dispensed in one application run; and a sensor configured to detect movement of the push rod. The control unit is configured to store a missing amount of the compound when one application run is interrupted. The dispenser dispenses the missing amount of the compound when the main switch is actuated for finishing the interrupted application. If an application run gets interrupted, for example due to empty battery, the missing amount of the compound is dispensed instead of the preselected amount. This function allows the application to proceed without additional chemical or compound wastage.

16 Claims, 3 Drawing Sheets

(56) References Cited

U.S. PATENT DOCUMENTS

| | | | |
|---|---|---|---|
| 6,854,349 B2 | 2/2005 | Brandhorst et al. | |
| 6,889,872 B2 | 5/2005 | Herman et al. | |
| 6,932,237 B2 | 8/2005 | Heymann et al. | |
| 7,116,071 B2 * | 10/2006 | Glasgow | H02H 9/025 |
| | | | 318/281 |
| 8,684,229 B2 | 4/2014 | Harre et al. | |
| 9,359,122 B2 | 6/2016 | Schmid et al. | |
| 9,931,665 B2 | 4/2018 | Cheung et al. | |
| 10,265,721 B2 | 4/2019 | Beckett et al. | |
| 10,682,666 B2 | 6/2020 | Routen et al. | |
| 10,894,272 B2 | 1/2021 | Turner et al. | |
| 11,130,150 B2 | 9/2021 | Welch | |
| 11,458,503 B2 | 10/2022 | Kuhn et al. | |
| 11,465,170 B2 | 10/2022 | Turner et al. | |
| 11,673,160 B2 | 6/2023 | Kuhn et al. | |
| 2009/0101673 A1 | 4/2009 | Alioto et al. | |
| 2011/0151042 A1 * | 6/2011 | Strobel-Schmidt | B29C 48/02 |
| | | | 425/145 |
| 2013/0020350 A1 | 1/2013 | Gardos et al. | |
| 2015/0266050 A1 * | 9/2015 | Beckett | B05C 17/0103 |
| | | | 222/310 |
| 2017/0259485 A1 | 9/2017 | Strobel-Schmidt et al. | |
| 2022/0000093 A1 * | 1/2022 | Ko | B05C 17/0103 |
| 2022/0339590 A1 | 10/2022 | Turner et al. | |
| 2023/0158541 A1 | 5/2023 | Schäuble et al. | |
| 2024/0017287 A1 * | 1/2024 | Stolt | B05C 17/0103 |

OTHER PUBLICATIONS

Written Opinion issued Jan. 25, 2022, in PCT/EP2021/081801, 6 pages.
Stolt et al., U.S. Appl. No. 18/256,594, filed Jun. 8, 2023.
Stolt et al., U.S. Appl. No. 18/256,408, filed Jun. 7, 2023.
Wiedemann et al., U.S. Appl. No. 18/256,385, filed Jun. 7, 2023.
U.S. Appl. No. 18/256,594, filed Jun. 8, 2023, Stolt et al.
U.S. Appl. No. 18/256,408, filed Jun. 7, 2023, Stolt et al.
U.S. Appl. No. 18/256,385, filed Jun. 7, 2023, Wiedemann et al.
Office Action received in U.S. Appl. No. 18/256,385 mailed on Mar. 10, 2025, 10 pages.

* cited by examiner

DISPENSER AND A CONTROL METHOD OF THE DISPENSER

CROSS-REFERENCE TO RELATED APPLICATIONS

This application the National Stage entry under § 371 of International Application No. PCT/EP2021/081801, filed on Nov. 16, 2021, and which claims the benefit of priority to European Application No. 20213002.7, filed on Dec. 10, 2020. The content of each of these applications is hereby incorporated by reference in its entirety.

BACKGROUND OF THE INVENTION

Technical Field

The present invention relates to a dispenser for compound-containing containers. The present invention also relates to a control method for use in such a dispenser.

Description of Related Art

A dispenser is used for dispensing compounds which are packaged in containers, such as mortar and sealing compounds, at a site of application. The containers include, for example, hard cartridges having one or more receiving chambers for one or more components of the compound to be dispensed which are provided directly or packaged, e.g. in foil packs, in the receiving chambers of the cartridge. The term "container" further includes foil packs which are filled with one or more compounds to be dispensed and which are inserted in a separate receiving body or in a receiving body mounted on the dispenser.

It is known that the dispenser can work in serial applications in which it eases the repetition of dispensing the same amount of compound. Mainly in serial applications, customers face the problem that a started application was interrupted. This can happen due to empty batteries, mortar shortage or user interaction. Current dispensers are only able to dispense the preselected amount of the compound for one application run. If the application was interrupted, it only could be started for the full amount of the selected dosing. Due to the fact, that the user just barely knows, how much volume was already dispensed, and the application will be finalized, mostly by chemical compound wastage or user dissatisfaction.

SUMMARY OF THE INVENTION

It is an object of the present invention to provide a method of control a dispenser, as well as the dispenser, which will be able to fulfil the interrupted application with the correct amount of compound, thereby reducing the waste of the compound and improve the user satisfaction, as well as easy to proceed after an aborted dosing application.

The method of the present invention for controlling the dispenser of the present invention includes the following steps:
 a). selecting an amount of the compound to be dispensed for one application run via an operation selection switch according to a selected position of the operation selection switch;
 b). triggering the main switch to activate the motor and a sensor detecting a movement of the push rod;
 c). interrupting the application run at a certain time before being completed;
 d). a control unit calculating a missing amount of the compound at the time of the interruption;
 e). re-actuating the main switch again and the missing amount of the compound being dispensed during that application run.

Thus, if an application run gets interrupted, not the preselected amount of the compound will be dispensed, but the missing amount of the compound. With this function, the user will be able to proceed the application without additional chemical or compound wastage.

According to the invention, interrupting the application run of the step c) means the application is stopped by deactivation of the main switch before being completed. Herein "application run" means one dosing process which is started by a user and terminated automatically once the preselected amount of the compound has been dispensed, e.g. when the push rod has been moved accordingly. However, if the application has to be stop before dispensing the whole preselect amount of the compound, the main switch being deactivated, this application run is interrupted. This can happen due to empty batteries, mortar shortage or user interaction.

Preferably, in the step e) of the control method, re-actuating the main switch may be double triggering, which is a different way with triggering the main switch in the step b). By double triggering and holding the main switch, the tool will dispense the missing amount of the last interrupted dosing. A different way to trigger the main switch is an instruction to the control unit, and then the control unit will dispense the missing amounts of the compound only, rather than the preselected amount of compound to be dispense in every application stroke in serial applications.

Preferably, the operation selection switch comprises a serial position in which one application run is repeated and the selected amount of the compound to be dispensed set by the operation selection switch is same in the repetition of the one application run. Therefore in serial applications, once one application run was interrupted, the user does not need to estimate how much amount of the compound had been dispensed before the interruption, just simply restarting the main switch by a different way with the first activating of main switch, the missing amount of the compound will be dispensed. Moreover, the next run of the serial application will not be affected. The selected amount of the compound to be dispensed will be performed again in the next application run without interruption.

Preferably, the control unit stores an updated missing amount from a previous interruption if the application run gets interrupted again and the updated missing amount of the compound is dispensed during that application run. If the application gets interrupted again, the missing amounts from the previous interruption will be updated, too. Every time, a dosing application process get interrupted before it was finished, the missing amounts of the compound for completing the interrupted dosing application gets stored. Hereby, the user can proceed easily after an aborted dosing application.

The present invention also provides a dispenser for compound-containing containers to perform the control method above. The dispenser comprises: a receiving chamber for a container; at least one push rod displaceable relative to the receiving chamber; a motor for moving the at least one push rod; a control unit for controlling the motor; a main switch for activating the motor; an operation selection switch for switching between different operation modes, the operation selection switch being configured to set a selected amount of the compound to be dispensed in one application run, a sensor being configured to detect a movement of the push rod. The control unit is configured to calculate a missing amount of the compound when one application run is interrupted and dispense the missing amount of the compound only when the main switch is re-actuated for finishing the interrupted application run. Said missing amount of the compound is the difference value of the selected amount in accordance with a selected position of the operation selection switch and an already dispensed amount of the compound in the interrupted application run.

Such a dispenser will be able to fulfil an interrupted application with the correct amount of the compound. If an application run gets interrupted, not the preselected amount of the compound for the full application run, but the missing amount of the compound will be dispensed. With this function, the user will be able to proceed the application without additional chemical or compound wastage.

According to the invention it is provided that the control unit comprises a memory module configured to store the value of the dispensed amount of the compound and a data process module configured to calculate the miss amount of the compound to be dispensed for the interrupted application run. With this memorized data, the user will be able to fulfill the interrupted application with the correct amount of the compound.

Preferably, the operation selection switch comprises a serial position in which the one application run is repeated and the selected amount of the compound to be dispensed is the same in the repetition of the one application run. Hereby, the dispenser is advantageously used in serial applications as the user does not need to estimate how much amount of the compound had been dispensed before the interruption, just simply restarting the main switch by a different way with the first time of triggering, the missing amount of the compound to for finishing the interrupted application run will be dispensed. The next run of the serial applications will not be affected. The selected amount of the compound to be dispensed for the one full application run will be performed again in the next run without interruption.

Preferably, the already dispensed amount of the compound is a value indicating the movement of the push rod. Hereby, it is possible to track the already dispensed amount in an easy way and the control unit can calculate the missing amount simply with the preselected amount minus the already dispensed amount of the compound.

In an advantageous configuration of the clamping device according to the invention it is provided that the dispenser comprises an indicator to reflect the completion of the dispensing for the interrupted application after the missing amount of compound with one application run is dispensed. The indicator can be an indicative light, or the dispenser can stop automatically after the missing amount of the compound is dispensed. Then the next full application stroke will start and dispense the selected amount of the compound as set by the application selection switch in serial applications. Moreover, the indicator can be also used to inform the user that the application run was interrupted. For example, a LED shows both states: interruption with red LED and finalization of the application run with green LED.

BRIEF DESCRIPTION OF THE DRAWINGS

Further features and advantages of the invention are described in greater detail hereinafter by means of an embodiment by way of example with reference to the drawings. In the Figures.

DETAILED DESCRIPTION

Figure 1:
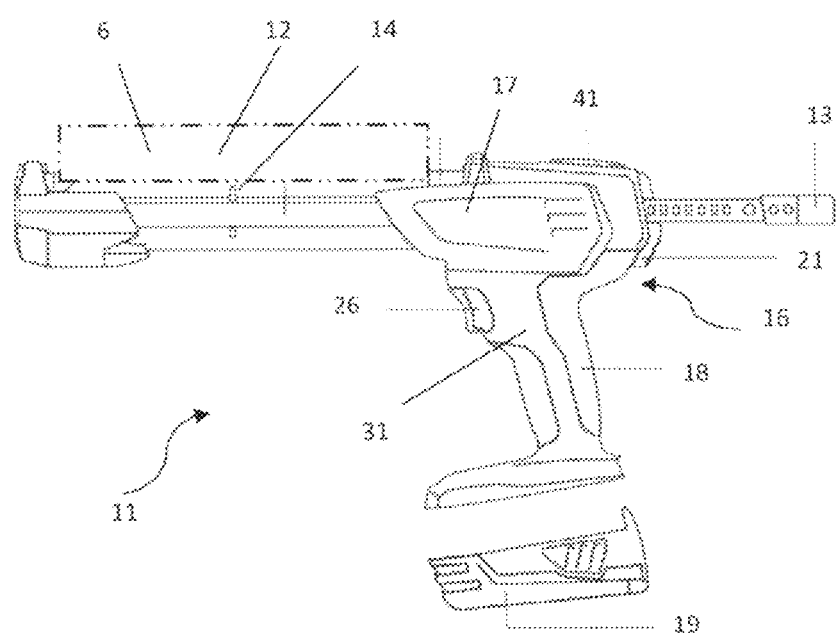
FIG. 1 is a top, front perspective view of an embodiment of a dispenser.

Dispenser 11 for compound-containing containers 6, as shown in FIG. 1, has a receiving chamber 12 for container 6, a push rod 13 which is displaceable relative to receiving chamber 12, and an electrically operable dispensing mechanism 16. A pressure piston 14 for applying pressure to container 6 and/or to the compound contained therein is provided on the end of push rod 13 facing receiving chamber 12. Operation of dispensing mechanism 16 causes push rod 13 to move into receiving chamber 12, thereby pressurizing the compound contained in container 6, causing it to be extruded through outlet of container 6. The compound contained in container 6 includes one or several components. According to a preferred embodiment of the invention, the compound contained in container 6 includes two compounds, thereby two push rods being displaceable relative to the receiving chamber 12. A mixer (not shown) is advantageously provided at outlet of container 6, said mixer ensuring complete mixing of the components prior to being discharged through the outlet.

Dispensing mechanism 16 is accommodated in a housing 17 having a handle 18 extending therefrom. A power supply 19 in the form of a battery pack is detachably connected to the free end of handle 18. Dispensing mechanism 16 includes a motor 21 which, via a transmission mechanism, drives a drive wheel (not shown) meshing with teeth on push rod 13, thereby moving the push rod 13.

Handle 18 is further provided with a main switch 26 in the form of a push button for activating motor 21. Also provided is a control unit 31 for controlling motor 21, said control unit having a power module for connecting the motor 21 to power supply 19.

Figure 2:
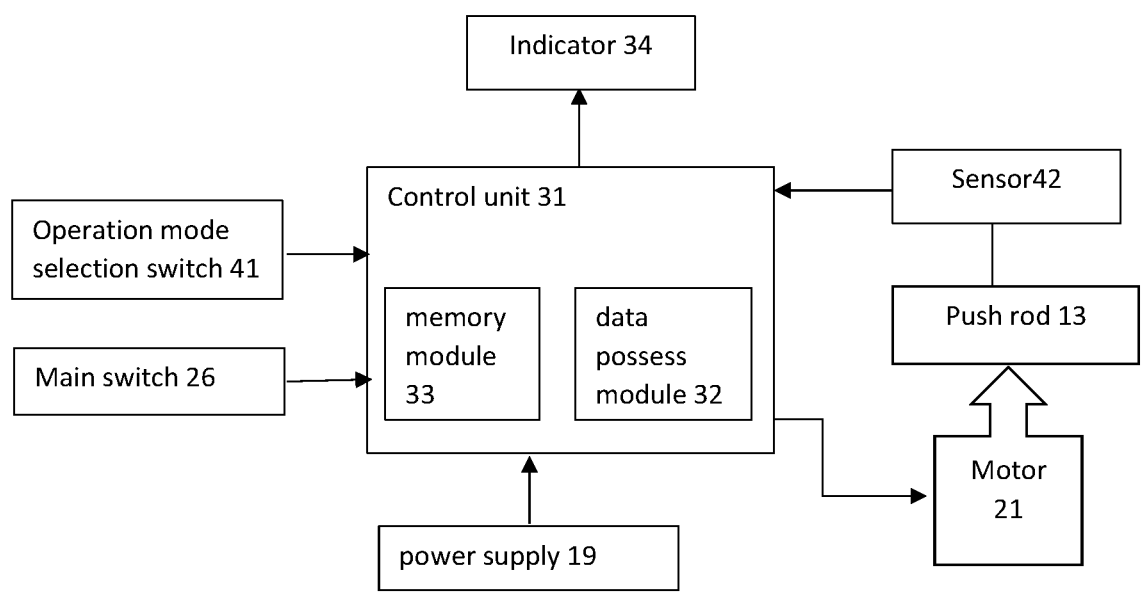
FIG. 2 is a schematic diagram of the dispenser of FIG. 1 including a control unit.

As shown schematically in FIG. 2, the main switch 26 is electrically connected to control unit 31. Furthermore, an operation selection switch 41 is provided for adjusting the amount of compound to be dispensed with each full stroke. This operation selection switch 41 is also electrically connected to control unit 31. Typically, the operation selection switch 41 is a dosing wheel. According to a preferred embodiment of the invention, Operation selection switch 41 includes a potentiometer and provides a plurality of possible settings for the dispensing of correspondingly defined amounts of the compound to be extruded, including a "zero" position, in which actuation of main switch 26 does not cause motor 21 to be connected to power supply 19, and a "continuous" position, in which motor 21 is connected to power supply 19 for as long as main switch 26 is actuated. Moreover, the operation selection switch 41 further includes a "serial" position, in which one application run is repeated and the selected amount of the compound to be dispensed is the same in the repetition of the one application run. Herein "application run" means one dosing process which is started by a user and terminated automatically once the preselected amount of the compound has been dispensed, e.g. when the push rod has been moved accordingly. An "interrupted application run" means one application run is stopped before the preselect amount of the compound has been fully dispensed, the main switch being deactivated.

The dispenser further comprises a sensor 42 for detecting the movement of the at least one push rod 13. The control unit 31 comprises a data process module 32 and a memory module 33. The sensor 42 is electronically connected to the control unit 31. The dispensed amount of the compound is a value indicating of the movements of the push rod 13. The sensor 42 sends the signal of the movements of the push rod 13 to the control unit, then the data process module 32 of the control unit will know the amount of the compound that has been already dispensed based on the movement of the push rod 13. Once one application run is interrupted, the data process module 32 will work out the missing amount of the compound for the one application run by a simple subtraction, that is: a missing amount is equal to the value of the selected amount minus the already dispensed amount.

Preferably, the memory module 33 of the control unit stores the missing amount of the compound for the interrupted application run. When the user re-actuates the main switch 26, for example, double triggering and holding it, the continued aborted dosing will proceed. The control unit 31 will activate the motor again, but only the stored missing amount of the compound will be dispensed, not the full pre-selected amount will be dispensed. Therefore, even in the serial applications, one application run was interrupted, the correct missing amount of compound is dispensed. The user can continue with the serial applications as normal after an aborted dosing.

Moreover, an indicator 34 is provided which is electrically connected to control unit 31 and which generates a user-perceivable signal when the interrupted application has been completed. As an exemplary embodiment, indicator 34 includes a LED for generating a visible signal. The indicator 34 can be also used to inform the user that the application run was interrupted. For example, a LED shows both states: interruption with red LED and finalization of the application run with green LED.

Figure 3:
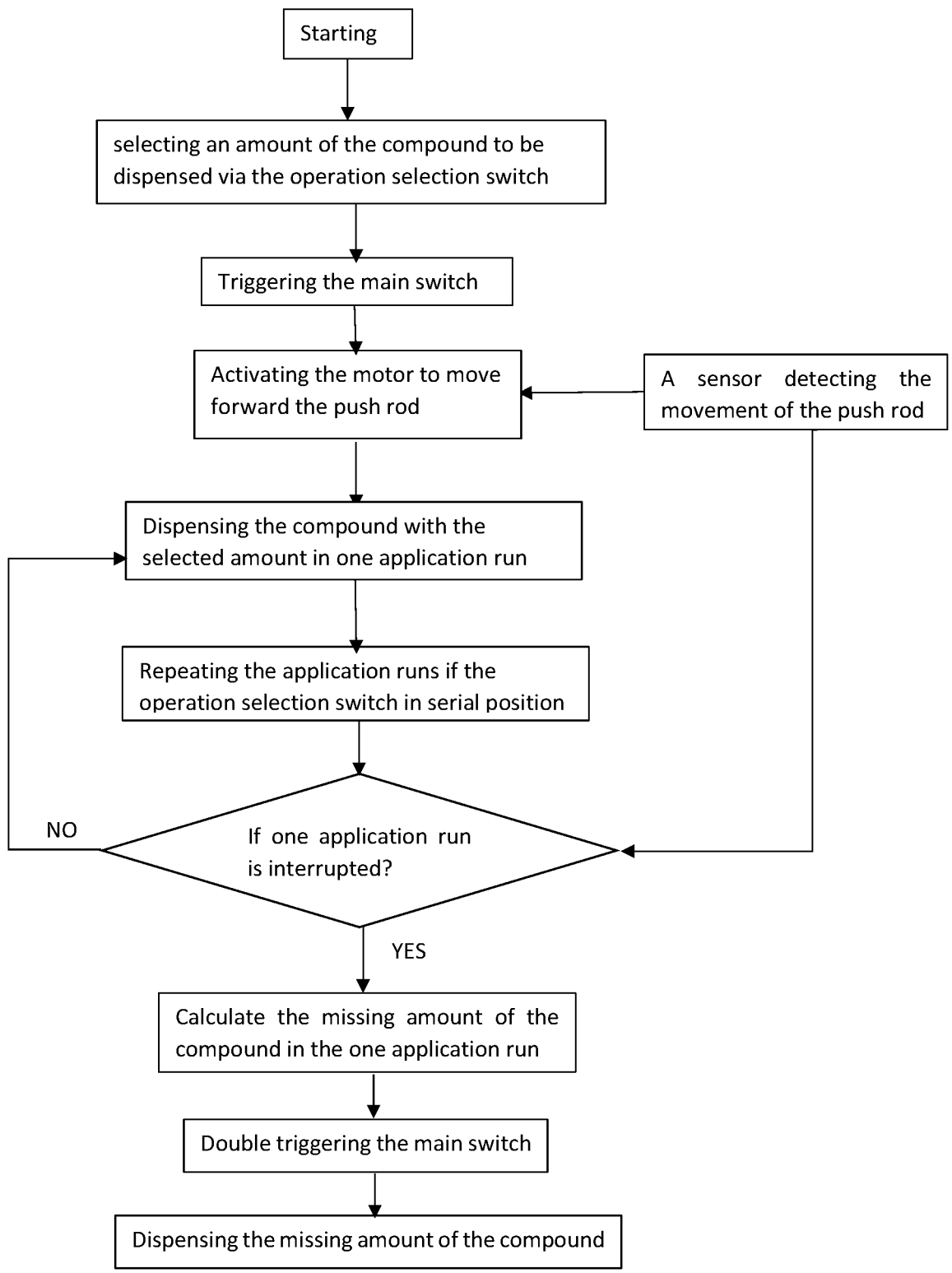
FIG. 3 illustrates the flow chart of the operating method of the dispenser of FIG. 1.

The method for controlling the dispenser 11 will now be described with reference to FIGS. 2 and 3. The method of the present invention includes the following steps:

a). selecting an amount of the compound to be dispensed for one application run via an operation selection switch according to a selected position of the operation selection switch 41. According to a preferred embodiment of the invention, the dispenser 11 performs a serial working mode when the operation selection switch 41 is selected in "serial" position. The dispenser performs repetition of one application run with the same amount of the compound. The user selects a defined amount of the compound to be dispensed for every application runs via the operation selection switch 41 and the dispenser will dispense the selected amount of the compound in repeated application runs until the whole serial applications are finished. The selected amount of the compound to be dispensed set by the operation selection switch 41 is the same in the repetition of every application run.

b). triggering the main switch to activate the motor and the sensor 42 detecting the movement of the push rod 13. Said push rod 13 is configured to link to the sensor 42 so that the movement of the push rod is detected by the sensor 42. As the dispensed amount of the compound is a value indicating the movement of the push rod 13. The sensor 42 sends the signal of the movement of the push rod to the control unit, and the data process module 32 will transmit the movement of the push rod into a value of the already dispensed amount of the compound.

c). interrupting the application run at a certain time before being completed. This can happen due to empty batteries, mortar shortage or user interaction. In serial applications, since the application run with the same selected dispensing amount of compound is repeated, once one started application run is interrupted, the selected dispensing amount will not be fully dispensed, just a portion of the selected amount has been dispensed before the interruption.

d). the control unit 31 calculating the missing amount of the compound if the one application run is interrupted. Once one application run was interrupted, the data process module 32 of the control unit will perform the following program, the selected amount of the compound minus the already dispensed amount of the compound to get the missing amount of the compound. The data of the missing amount will be stored in the memory module 33 of the control unit 31.

e). re-actuating the main switch and the control unit to move the push rod to dispense the missing amount of the compound. Preferably, in this step e), re-actuating the main switch may be double triggering or long pressing, which is a different way with triggering the main switch in the step b). By double triggering and holding the main switch 26, the tool will dispense the missing amount of the last interrupted dosing application run. A different way to trigger the main switch 26 is an instruction signal to the control unit 31, and then the control unit 31 will dispense the missing amounts of the compound only, rather than the selected amount of compound for the one full application stroke. With this memorized data, the user will be able to fulfil the interrupted application with the correct amount of the compound.

Preferably, the control unit 31 updates the missing amount from last interruption if one application run gets interrupted again. Then the updated missing amount of the compound will be dispensed once the interrupted application is proceeded again. Every time, a dosing process get interrupted before it was finished, the missing amounts of dosing for finishing the interrupted application run gets stored. With this function, the user is able to fulfil the application without additional compound wastage and can easily proceed after an aborted dosing.

Using the dispenser according to the present invention an operator is able in a convenient manner to perform a correct amount compound in an interrupted application, thereby avoiding additional compound wastage and improving the user satisfaction. While only selected embodiments have been chosen to illustrate the present invention, it will be apparent to those skilled in the art from this disclosure that various changes and modifications can be made herein without departing from the scope of the invention. Thus, the foregoing descriptions of the embodiments according to the present invention are provided for illustration only, and not for the purpose of limiting the invention.

The invention claimed is:

1. A method of dispensing a compound from a dispenser for a compound-containing container, the dispenser comprising a receiving chamber for a container, at least one push rod displaceable relative to the receiving chamber, a motor for moving the at least one push rod, a control unit comprising a memory module and a data processing module and configured to control the motor, a main switch for activating the motor, an operation selection switch configured to set a selected amount of the compound to be dispensed for one application run in an application run, and a sensor configured to detect movement of the at least one push rod, the method comprising:

selecting the selected amount of the compound via the operation selection switch;

activating the motor via the main switch to displace the at least one push rod and begin dispensing the compound in the application run;

determining, using the sensor, an already dispensed amount of the compound;

calculating, by the data processing module, a missing amount of the compound based on a difference between the selected amount and the already dispensed amount;

storing the missing amount in the memory module when the application run is interrupted; and upon re-actuation of the main switch, activating the motor to dispense the missing amount stored in the memory module to finish the interrupted application run.

2. The method of claim 1, wherein the application run is interrupted by deactivation of the main switch, and the control unit detects the interruption based on a signal from the main switch before completion of the selected amount of the compound.

3. The method of claim 1, wherein the main switch is configured such that re-actuation to resume the interrupted application run involves a double triggering action that differs from the initial activation of the main switch.

4. The method of claim 1, wherein the operation selection switch comprises a serial mode configured to repeatedly initiate the application run using the same selected amount of the compound.

5. The method of claim 1, wherein the memory module is configured to update the missing amount of the compound when the application run is interrupted more than once, and to store the updated missing amount for use upon subsequent re-actuation of the main switch.

6. The method of claim 1, wherein the already dispensed amount is determined based on movement of the at least one push rod as detected by the sensor.

7. The method of claim 1, further comprising displaying or otherwise reflecting the missing amount of the compound being dispensed during completion of the interrupted application run using an indicator.

8. The method of claim 1, further comprising informing a user via an indicator that the application run was interrupted prior to completion.

9. A dispenser for a compound-containing container, comprising:

a receiving chamber for a container;

at least one push rod displaceable relative to the receiving chamber;

a motor for moving the at least one push rod;

a control unit comprising a memory module and a data processing module and configured to control the motor;

a main switch for activating the motor;

an operation selection switch for switching between different operation modes, the operation selection switch configured to set a selected amount of a compound to be dispensed in one an application run; and a sensor configured to detect a movement of the at least one push rod, wherein the data processing module is configured to calculate a missing amount of the compound when the application run is interrupted, based on a difference between the selected amount and an already dispensed amount determined from the sensor input, wherein the memory module is configured to store the missing amount, and wherein, when the main switch is re-actuated, the control unit is configured to activate the motor to dispense the missing amount of the, using the missing amount stored in the memory module, to finish the interrupted application run.

10. The dispenser of claim 9, wherein the already dispensed amount of the compound is determined based on movement of the at least one push rod as detected by the sensor.

11. The dispenser of claim 9, wherein the operation selection switch comprises a serial mode configured to repeatedly initiate the application run using the same selected amount of the compound.

12. The dispenser of claim 9, further comprising an indicator configured to display or otherwise reflect the missing amount of the compound being dispensed during completion of the interrupted application run.

13. The dispenser of claim 9, further comprising an indicator configured to inform a user that the application run was interrupted prior to completion.

14. The dispenser of claim 9, wherein the main switch is configured such that deactivation of the main switch before completion of the application run causes the control unit to detect the interruption.

15. The dispenser of claim 9, wherein the main switch is configured such that re-actuation to resume dispensing after the interrupted application run involves a double triggering action.

16. The dispenser of claim 9, wherein the memory module is configured to update the missing amount of the compound when the application run is interrupted more than once, and to store the updated missing amount for use upon re-actuation of the main switch.

* * * * *